United States Patent [19]

Sturtevant-Stuart

[11] Patent Number: 4,608,618
[45] Date of Patent: Aug. 26, 1986

[54] DIGITAL ALIGNMENT DIAGNOSTIC DISK

[75] Inventor: Ronald M. Sturtevant-Stuart, San Francisco, Calif.

[73] Assignee: Verbatim Corporation, Sunnyvale, Calif.

[21] Appl. No.: 664,580

[22] Filed: Oct. 25, 1984

[51] Int. Cl.$^4$ .......................... G11B 5/58; G11B 21/10
[52] U.S. Cl. ...................................... 360/135; 360/75; 360/77; 360/25; 360/31
[58] Field of Search ...................... 360/75, 77, 78, 135, 360/31, 109, 27, 25

[56] References Cited

U.S. PATENT DOCUMENTS

| | | | |
|---|---|---|---|
| 3,593,331 | 7/1971 | Connell | 360/135 |
| 3,962,724 | 6/1976 | Koizumi | 360/31 |
| 4,084,201 | 4/1978 | Hack et al. | 360/135 |
| 4,149,199 | 4/1979 | Chick et al. | 360/77 |
| 4,157,577 | 6/1979 | Porter, Jr. et al. | 360/77 |
| 4,456,938 | 6/1984 | Baasch et al. | 360/109 |
| 4,458,275 | 7/1984 | Monti | 360/78 |
| 4,488,187 | 12/1984 | Alaimo | 360/77 |
| 4,513,331 | 4/1985 | Baker et al. | 360/75 |
| 4,513,333 | 4/1985 | Young et al. | 360/77 |

FOREIGN PATENT DOCUMENTS 0121590 10/1984 European Pat. Off. .............. 360/31

Primary Examiner—Raymond F. Cardillo
Assistant Examiner—Steven R. Garland
Attorney, Agent, or Firm—Dennis P. Monteith

[57] ABSTRACT

An alignment disk including data tracks written in a spiral configuration, through the use of microstepping techniques, to accurately test a variety of transducer head parameters including head alignment, resolution and offset. The tracks include standard spiral tracks, S-shaped clamping spiral tracks and bordered spiral tracks, comprising a sequence of discrete address blocks each containing unique identifying information. The spacing of each address block is precisely known and because each is separately identifiable transducer head location can be precisely ascertained. The microstepping technique may also be employed to create a copy protected disk for disk drives having half-track read and write capabilities.

7 Claims, 4 Drawing Figures

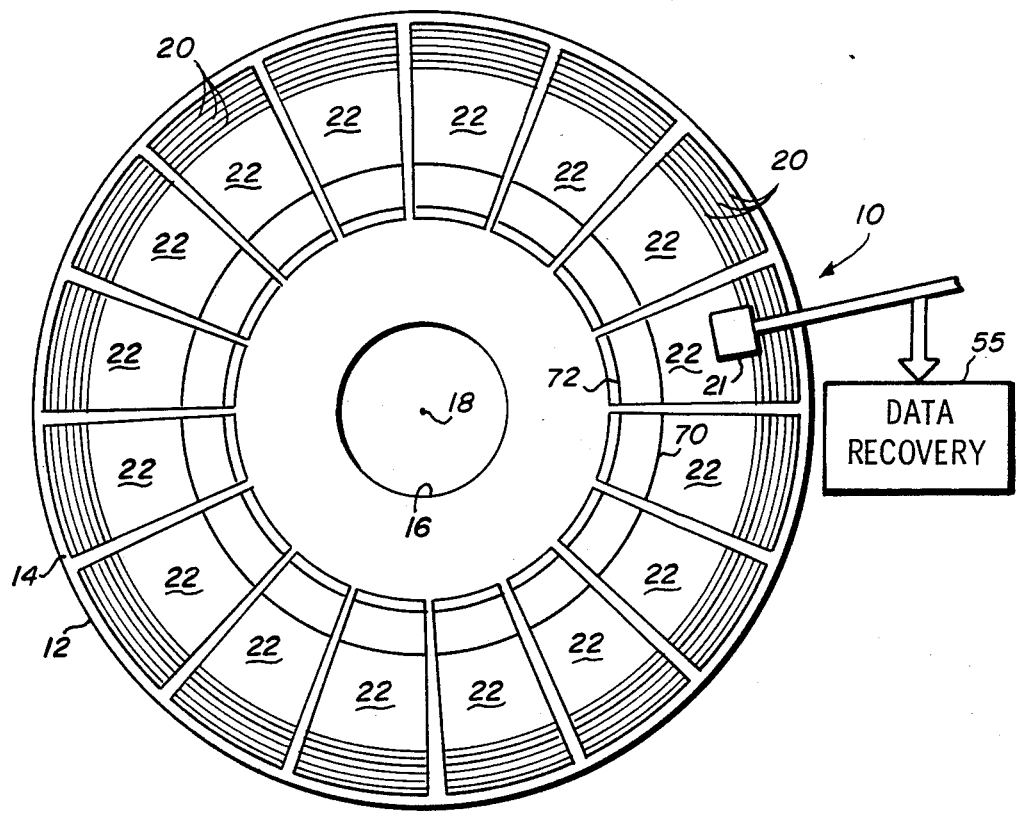
Fig_1
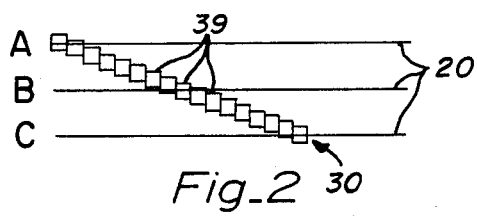
Fig_2
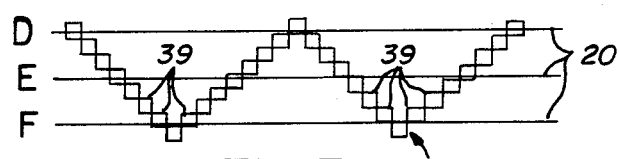
Fig_3
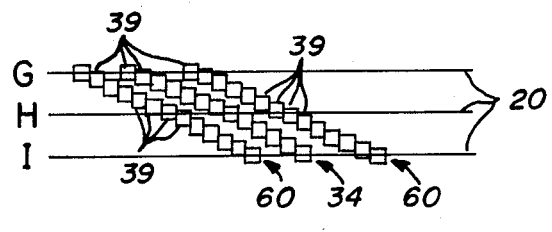
Fig_4

DIGITAL ALIGNMENT DIAGNOSTIC DISK

BACKGROUND OF THE INVENTION

1. Field of the Invention

The present invention relates generally to an apparatus for testing the alignment of a transducer head, and more particularly to an alignment disk for use with disk drives to check the alignment thereof.

2. Description of the Prior Art

Proper alignment of the transducer head of a magnetic data storage device with the data tracks on a magnetic medium, whereby the transducer head fully and correctly reads data from the appropriate track, is essential to accurate data transfer. Computers are increasingly employed in a variety of applications in the home, business, scientific and educational environments. In particular, personal or microcomputers, having either integral or separate disk drives, are being employed to satisfy data processing needs. It can be appreciated that these environments are often very hostile to both the disk drive and to the magnetic storage media. Even slight changes in the alignment of the transducer head of a disk drive system can affect the ability of the disk drive to reliably read data recorded on the disk prior to the change in alignment, or recorded by another, properly aligned disk drive. Because of the interchangeability of flexible storage media, proper head alignment to a predetermined standard is necessary to ensure that data may reliably be read from various disks regardless of whether the disk was written by the same drive or by another drive.

While many methods of head alignment are possible, including complex servo systems which automatically adjust alignment, the most common practice with respect to flexible disk drives has been a manual adjustment performed by service technicians utilizing a specially recorded disk at an oscilloscope. This technique, known as the "cat's eye" alignment technique is described by Hersey, Jr. in U.S. Pat. No. 4,053,937. That technique, requires special equipment and a qualified technician.

Additional prior art attempts have been made to provide a means of checking alignment relative to magnetic recording devices. These however, are generally complex, expensive, and/or not amenable to flexible disk drives. U.S. Pat. No. 4,419,700, issued to Ragle et al. discloses a method and apparatus for recording on a magnetic disk in a spiral track configuration. U.S. Pat. No 4,415,939 issued to Ballard describes a servo encoding scheme and demodulation circuit for the control of the read/write head with respect to the magnetic disk. The apparatus of Ballard is not concerned with alignment monitoring per se, but with the actual apparatus for positioning of the head relative to the disk. U.S. Pat. No. 4,414,589 issued to Oliver et al. also discloses a servo track positioning system for accessing a plurality of concentric data tracks on a magnetic disk. U.S. Pat. No. 3,962,724 issued to Koizumi relates to a method and device for testing a transducer head of a disk drive utilizing a disk having a spiral track recorded thereon. However, the method and apparatus disclosed by Koizumi is not designed for disk drives used with flexible magnetic disks having data recorded in a plurality of concentric tracks. IBM Technical Disclosure Bulletin entitled "Helical Data Track Access Control," authored by F. Tsui and K. Tsui, Volume 15 No. 3, August 1972, discloses a servo system for accessing helical data tracks in a magnetic disk storage system.

In view of the prior art, there remains a need for a simple, effective and accurate method and apparatus for diagnosing transducer head misalignment, and related problems in flexible disk drives used with magnetic information storage systems.

SUMMARY OF THE PRESENT INVENTION

It is therefore an object of the present invention to provide a means for checking a plurality of transducer head conditions including alignment, positioner profile, positioning hysteresis, read sensitivity, head width, clamping, pressure pad, head wear and track zero stop adjustment.

It is a further object of the present invention to provide a means by which a relatively non-technical person can test transducer head parameters.

It is a further object of the present invention to provide an economical means by which transducer head parameters may be tested.

It is a further object of the present invention to provide a means by which transducer head parameters may be tested without the requirement of special test instrumentation.

It is a further object of the present invention to provide a means by which transducer head parameters may be tested and serviced within a computer under operational conditions without disassembly of the disk drive.

It is a further object of the present invention to provide a means for checking and calibrating a transducer head of a disk drives which performs all the calculations needed, thus eliminating the possibility of calculation errors and the need for technical interpretation of the data.

It is a further object of the present invention to provide a highly accurate and reliable means for testing a variety of disk drive parameters.

It is a further object of the present invention to provide a means which may be used for copy protecting disks when used in conjuction with disk drives having half track capabilities.

Briefly, a preferred embodiment of the present invention includes a flexible disk data storage medium having a series of diagnostic tracks specially written in a spiral configuration through the use of microstepping techniques. The disk includes three basic kinds of spiral tracks; standard spiral tracks, clamping spiral tracks, and bordered spiral tracks. These three types of tracks allow testing of a number of disk transducer head parameters, including: dynamic alignment, positioner profile, positioning hysteresis, read sensitivity, head width, clamping offset, pressure pad wear, head wear and track zero stop adjustment. In addition, by performing these tests over a period of time, time performance charts may be maintained to keep the disk drive in conformity with ANSI standards, and thus to prevent disks from being written which could be read only on a misaligned drive.

The tracks are written in a continuous series of address blocks, approximately twenty to thirty-two bytes in length depending on the particular coding format. Each address block contains unique identifying information distinguishing it from the remaining blocks.

The standard spiral tracks of the alignment disk form a spiral because they are comprised of individual address blocks stepped at the rate of one step per byte, each step comprising 6.67 micro inches. Because the average five and one quarter inch disk includes 6,225 bytes, this results in a total track displacement of forty-four one-thousandths of an inch. The clamping spiral is approximately three times as steep i.e., three steps per byte, and written as a continuous curve crossing the center track in three places. The clamping spiral further is written about the disk in at least three places, one hundred and twenty degrees apart about the disk circumference. Bordered spiral tracks are written in a manner similar to normal spiral tracks, however the bordered spiral tracks are bordered on either side by adjacent spiral tracks designed to interfere with the read electronics as the head attempts to read the center track.

When the disk is inserted into a disk drive, the head alignment is determined by reading the spiral alignment tracks at various points on the disk and determining the two outermost address blocks from which the transducer head can reliably read data. These outer address blocks constitute end points of a read width, and by knowing the location of each address block, an accurate determination of head location is obtained by finding the midpoint of these two address blocks. Similarly, tests for clamping errors, resolution, positioning hysteresis, head width, pressure pad, and head wear all may be performed by accurately locating head position at several points on the disk, and/or by determining the number of address blocks read by the head, through the use of the spiral tracking technique, wherein a number of separate address blocks are written to be very closely spaced across the width of three recording tracks.

An advantage of the present invention is that it provides a means by which a relatively non-technical person can easily test head alignment in a flexible disk drive mechanism.

Another advantage of the present invention is that it provides a means by which the head alignment of a disk drive mechanism can be tested without the requirement of special test equipment such as an oscilloscope.

Another advantage of the present invention is that it provides a means for performing a multiplicity of tests, including dynamic head alignment, positioner profile, positioning hysteresis, read sensitivity, head width, clamping, pressure pad, head wear and track zero stop adjustment.

Another advantage of the present invention is that it provides a means of producing a copy protected disk which may be utilized with disk drives having half track capabilities.

Another advantage of the present invention is that it provides a high resolution means of checking head alignment.

Another advantage of the present invention is that it is inexpensive to produce, manufacture, and use.

Another advantage of the present invention is that testing and servicing of the head may be performed within a computer under operational conditions without the need for disassembly of the disk drive apparatus.

These and other objects and advantages of the present invention will no doubt become obvious to those of ordinary skill in the art after having read the following detailed description of the embodiment which is illustrated in the various drawing figures.

IN THE DRAWINGS

FIG. 1 is a schematic top view of a flexible magnetic data storage disk illustrating a typical approach for locating data on the disk;

FIG. 2 is an enlarged diagrammatic view showing the locations of the address blocks for the spiral alignment tracks;

FIG. 3 is an enlarged diagrammatic view showing the locations of the address blocks for the clamping tracks; and FIG. 4 is an enlarged diagrammatic view showing a bordered spiral truck.

DETAILED DESCRIPTION OF THE PREFERRED EMBODIMENT

FIG. 1 illustrates a disk of the present invention and referred to by the general character 10. The disk 10 includes a base substrate material 12 upon which is coated a layer of magnetic recording material 14. The disk 10 further includes a central mounting aperture 16, and a central axis of rotation 18. Concentrically arrayed about the disk 10 about an area extending from approximately the outer perimeter to approximately two-thirds of the distance toward the central axis 18, is a plurality of ANSI standard data track locations 20, only a few of which are illustrated. Also, schematically illustrated in FIG. 1 is a read/write head 21, in place over the disk 10. The disk 10 is a five and one quarter inch, forty-eight tracks per inch (TPI) disk, having approximately forty data tracks located about its surface. It should be noted however that various other track densities are commonly used in the art, including ninety-six and one hundred thirty-six TPI disks, and all are consistent with the present invention. The disk 10, having a forty eight TPI format, includes a track positioning and spacing in accordance with ANS X3.82–1980. This standard results in the spacing between center lines of adjacent track locations 20, as illustrated in FIGS. 2 and 3, of approximately 0.02083 inches.

The disk 10 may be further divided into a plurality of arbitrarily designated, radial sectors 22. Disk 10 is illustrated with sixteen sectors 22, although it should be recognized that other numbers of sectors including ten, thirteen, fourteen and twenty-six are commonly used in the art and all are consistent with the present invention.

There are three basic kinds of spiral tracks on the disk 10. These include a standard spiral track 30, illustrated in FIG. 2, a clamping spiral 32, illustrated in FIG. 3, and a bordered spiral 34, illustrated in FIG. 4. Each track 30, 32 and 34 is written in a continuous series of address blocks 39, each of which contains unique, identifying information.

The standard spiral track 30 forms a spiral because it is radially stepped at a rate of a six and sixty seven one hundredths microinch step per byte. A block of approximately twenty bytes, represented by the squares in FIGS. 2, 3 and 4 constitutes an individual address block 39. It may be noted that the number of bytes within an address block 39 may be varied, and the number may depend on the type of coding format used. Further, the exact spacing of the address blocks 39 may vary from that illustrated in the drawings. The track 30 is written by starting with the head 21 centered on a preselected track A, which is adjacent to a track B, designated a zero track, and writing the spiral track 30 until the last address block 39 of the track 30 is centered on a track C on the other side of the zero track B. To check head alignment, the spiral tracks 30, located at a plurality of portions on the disk 10 are read by the transducer head 21. A first alignment pass is made by stepping the transducer head 21 to the zero track B. Because each address block 39 within this spiral track 30 contains unique identifying information, it can always be ascertained which address block or blocks 39 of the spiral track 30 the transducer head 21 is reading. A properly aligned transducer head 21 should be centered about the zero track B. Within this track B, the width of the transducer head 21 will enable the head 21 to pick up a number of address blocks 39. At a certain lateral point beyond which the head 21 can no longer properly recover data, the information contained within the address block 39 will become unreadable. By knowing the position of the outermost address blocks 39 that can be reliably read by the transducer head 21, the location of the transducer head 21 is easily ascertained by calculating the midpoint of these two address blocks 39. This allows for checking transducer head alignment to a very high accuracy, because the address blocks 39 of the alignment track 30 are extremely small and closely spaced. The resolution is on the order of sixteen hundredths mils when used with MFM encoding formats, and seven hundredths mils when used with GCR encoding formats.

The clamping track 32, illustrated in FIG. 3 is similar to the spiral alignment track 30 but utilizes a steeper slope as the same resolution is not necessary. The clamping track 32 is located about at least three sectors 22 which are approximately one hundred and twenty degrees apart about the disk 10. The clamping track 32 is used in a manner similar to the alignment track 30 to measure displacement of the transducer head 21 from a preselected zero track E, which is intermediate to a track D and a track F. By placing the clamping track 32 at three locations about the disk 10, measurements of head displacement may be taken to a component in any radial direction of the disk 10. The curved sinusoidal arrangement of the track 32 provides greater accuracy in determining eccentricity of the head 21 due to clamping errors. It may be noted that other arrangements of the individual address blocks 39 will function as well, for example three parallel spiral tracks, or the alignment spiral 30 can also be used to measure head displacement from a preselected track caused by clamping error. The clamping test can determine clamping errors due both to operator error and to faulty clamping mechanisms of the disk drive itself. If the former is found, the disk is re-inserted. The latter are applied to other tests to compensate for the misclamping.

A third test that may be performed by using the disk 10 is that of positioner profile whereby the amount and direction of offset of a transducer head 21 driving cam (not shown) may be determined. The positioner profile is performed by checking head alignment, using either the spiral alignment track 30 or the clamping track 32, at several different points on the disk. The alignment track 30 and clamping tracks 32 are utilized in the same way they are utilized for the alignment and clamping tests, respectively, to check the amount of deflection of the transducer head 21 from a zero track. By computing the direction and degree of misalignment at various points, a profile of cam eccentricity may be developed. This particular test provides a manufacturer of a disk drive mechanism with important quality control capabilities as it enables to accept or reject a disk drive prior to shipment.

The disk 10 may also be used to check hysteresis. Two major problems with disks drives are mechanical flutter, and stepping and alignment variations caused by mechanical backlash due to changes in the direction of head travel. The mechanical flutter problem is associated with the inertia of the head 21 in moving from location to location about the disk 10. A transducer head commonly requires a settle time, sometimes as high as one hundred milliseconds, in order to produce a stable and consistent reading. The disk 10 allows for checking of such flutter by stepping from track to track and immediately checking alignment at each track. Variations in alignment due to differences in direction of head travel may also be checked by this procedure.

Additionally, the disk 10 may be used to test read sensitivity. This test is specifically designed to test a data recovery circuit 55, schematically illustrated in FIG. 1 and electrically coupled to the read/write head 21. Read sensitivity is checked utilizing either the alignment track 30 or the clamping track 32. Preferably the alignment track 30 is used as it provides for a greater resolution due to the lesser slope i.e., closer spacing of the individual address blocks 39. Read sensitivity is tested in a manner identical to alignment, however the crucial parameter in the resolution test is on the number of address blocks 39 from which the transducer head 21 is recovering data, rather than the midpoint between two outer address blocks 39. This yields a width of address blocks 39 across which the read circuit 55 is recovering data. It should be noted that this test may also be used to determine wear, and dirt buildup on the transducer head 21. This is done simply by performing the read sensitivity test over time and comparing results of subsequent reads to previous reads. A dirty head will result in a shrinking of the band width over which the transducer head 21 may accurately recover data. Wear of the transducer head 21 has the opposite effect of increasing the number of address blocks 39 across which the head 21 may recover data.

Another test that may be performed utilizing the disk 10 is that of head width which is advantageously used to determine how closely a disk drive's head size conformes to ASNI standards. Head width is tested using the bordered spiral tracks 34 depicted in FIG. 4. The bordered spiral tracks 34 are spiralled in substantially the same manner as the spiral track 30 of FIG. 2, with the first address block 39 of the spiral track 34 centered on a preselected track G, which is adjacent to a zero track H, and the last address block 39 centered on a track I on the opposite side of the track H. A pair of spiral interference tracks 60 are placed adjacent to the spiral track 34. The interference tracks 60 include encoded information designed to inhibit the read circuitry 55 as the head 21 passes from spiral track 34 to border track 60. This is done by increasing a noise-to-signal ratio of the information encoded in the interference tracks 60 which forces reading to stop. By looking at an absolute width which the head 21 is reading, and then phasing out the electronic data recovery circuit 55 through the interference of track 60, an accurate measure of head width may be obtained. This test may be combined with the read sensitivity test in order to differentiate the capacity of the electronics 55 to recover data from the physical characteristics of the head 21 itself. This is done simply by reading data twice, once on the bordered spiral track 34 and once on the standard spiral track 30 and correcting for the read sensitivity determined by the track 30.

Insufficient or uneven pressure exerted by a disk drive pressure pad may also be detected by the disk 10. This is accomplished by reading a plurality of address blocks 39 of either the spiral tracks 30 or the clamping spiral tracks 32 and analyzing the resulting block of data using appropriate software (not shown). The address blocks 39 of the appropriate track 30 or 32 are analyzed, using a digital recovery circuit, (not shown) for "sharpness." Drop-outs within the address blocks 39 indicate edges beyond which a pressure pad is not exerting sufficient pressure on the head 21 to produce readable data. The sharpness of these edges indicate pressure pad functioning. Where there is a clearly defined drop-out boundry after a span of accurately read data, the pressure pads are functioning normally. Where the drop-outs appear intermittantly among readable data, the pads are in need of adjustment or replacement.

As an aid to disk drives which are badly out of alignment (up to eight mils) one of the track locations 20 of the disk 10 may comprise a Turner track 70, which is an extra wide track. The Turner track 70 of the disk 10 is written to be approximately twice as wide as a standard ANSI track width, and contains boot information to direct the head 21 to the appropriate data track location 20 located elsewhere on the disk 10. In this way badly aligned disk drives may be checked using the disk 10.

It should be noted that all of the foregoing tracks 30, 32, 34, and 70 are operable independently of each other. Thus an alignment disk may include only a single track 30, 32, 34, or 70 or any combination of such tracks and the disk 10 includes the following track format:

| ANSI track designation | description |
| --- | --- |
| 0 | spiral track 30 |
| 4 | clamping spiral 32 |
| 8 | spiral track 30 |
| 12 | bordered spiral 34 |
| 16 | spiral track 30 |
| 20 | clamping spiral 32 |
| 24 | spiral track 30 |
| 28 | bordered spiral 34 |
| 31 | Turner track 70 |
| 34 | clamping spiral 32 |
| 38 | spiral track 30 |
| 40 | standard track 72 |

At the innermost track location 20, ANSI track number forty is a standard recording track 72. This track 72 is provided as a quality control aid and functions as an absolute measure of overall track spacing and positioning. It is utilized by stepping the head 21 out a sufficient number of steps to reach the track 72 and determining if data can be accurately recovered therefrom. By stepping the head 21 back to the zero track, comprising a spiral track 30, and reading the address blocks found thereon, a zero track stop adjustment may be made. Additional adjustments to the disk drive may advantageously be made while the drive is operating with the disk 10 in place. The only limitation to such adjustments and/or servicing is the accessability of the components while the drive is operational.

The disk 10 containing the spiral tracks 30 having the address blocks 39 may be utilized in conjunction with microcomputers or other systems capable of reading and writing half tracks in order to provide copy protection for software when used in conjunction with such computers. Because of the close spacing of the address blocks 39 on the alignment tracks 30 of the disk 10, different data must be written on adjacent half tracks, which will be unreadable, hence uncopyable by any computer unable to step a read/write head to the resolution of the address blocks 39. Any attempt to write a track on another, or a different track on a half track, will end up overwriting, thus erasing the track.

While the disk 10 has been described in terms of a forty-eight TPI, five and one-quarter inch disk, the present invention is consistent with all of the current disk formats, including the three-and-one-half, and eight inch disks, as well as ninety-six, one hundred thirty-two TPI, and higher track densities. For improved resolution, headers of the forty-eight TPI disk are written using a ninety-six TPI write head. This gives a much cleaner edge to the header which improves resolution for most of the test performed with the disk 10. Correspondingly, if a ninety-six TPI disk is to be produced, a smaller head is preferable, e.g. a one hundred thirty-two TPI head. It may also be noted that the step rate is merely a mechanical consideration and may be changed depending on track density and desired resolution. For example, each header of the spiral track 30 is diplaced from the next header by a distance of six and sixty-seven one hundredths microinches in the disk 10, having a forty-eight TPI. When the present invention is utilized in a ninety-six TPI format, this distance will normally be correspondingly decreased, for example, to approximately two microinches, to maintain the desired resolution.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. In an alignment disk comprising a disk substrate, a magnetic recording layer overlaying said disk substrate and suitable for recording a plurality of separate tracks, the improvement comprising:

a plurality of spiral tracks recorded on said magnetic recording layer for testing a plurality of parameters of a transducer head of a disk drive, each of said spiral tracks including a continuous series of individual address blocks containing unique identifying information and extending across at least two ANSI standard format recording tracks, said address blocks being radially spaced in increments less than one half of a standard ANSI track width, said plurality of spiral tracks including;

a spiral alignment track for checking alignment of a transducer head;

a clamping spiral track, including a plurality of address blocks, which are arrayed about at least two ANSI standard track locations so as to cross each track at least twice, said clamping spiral address blocks being radially spaced relative to each other to a greater degree than said spiral alignment address blocks; and a bordered spiral track including a first spiral arrangement of address blocks extending radially inwards towards a disk center and crossing at least two ANSI standard track locations, and further including a pair of border tracks, arrayed on either side of said first spiral track of address blocks, said border spiral tracks including address blocks containing information adapted to interfere with a reading of a plurality of data encoded onto said center spiral track whereby a disk drive electronic data recovery circuit may be analyzed.

2. The alignment disk of claim 1 wherein the spiral alignment track includes a first address block located about an ANSI standard track location, a second address block located about a second ANSI standard track location, said second ANSI standard track being two ANSI standard track widths apart said first ANSI standard track; and a plurality of intermediate address blocks between said first and said second address blocks.

3. The alignment disk of claim 2 wherein
said address blocks are radially equally spaced from one another.

4. The alignment disk of claim 1 wherein
the clamping spiral track includes
a first address block located about a first ANSI standard track location;
a second address block located about a second ANSI standard track location, said second ANSI standard track location being two ANSI standard track widths from said first ANSI track location; and
a plurality of intermediate address blocks between said first and said second ANSI standard track locations, and crossing a third ANSI standard track midway between said first and said second standard tracks.

5. The alignment disk of claim 4 wherein said intermediate address blocks are radially equally spaced from one another, and are angularly equally spaced from one another, and describe an S-shape between said first and said second address blocks.

6. The alignment disk of claim 5 wherein
said address blocks are radially spaced approximately 6.67 microinches apart.

7. The alignment disk of claim 1 wherein
the bordered spiral includes a first, a second, and a third adjacent spiral track, said second spiral track being intermediate to said first and said third spiral tracks, said first, second, and third spiral tracks each including a first address block, precisely located about a first ANSI standard track location;

said first, second, and third spiral tracks each include a second address block, located about a second ANSI standard track location, said second ANSI standard track location being two standard track widths apart from said track location; and said first, second and third spiral tracks further includes a plurality of intermediate address blocks between said first and said second tracks and crossing a third ANSI standard track location, said third ANSI standard track located midway between first said and said second standard tracks.

* * * * *